(12) United States Patent
DeVito et al.

(10) Patent No.: US 7,776,948 B2
(45) Date of Patent: Aug. 17, 2010

(54) COMPOSITE COUNTERWEIGHT AND METHOD OF MAKING SAME

(75) Inventors: Lucas B. DeVito, Grand Rapids, MI (US); Jonathan R. DeYoung, Grand Rapids, MI (US); Mark R. Smith, Zeeland, MI (US); Nathan L. Wood, Jenison, MI (US); Jim R. Cuatt, Holland, MI (US); Robert C. Koning, Allendale, MI (US); William K. McAfee, II, Grand Rapids, MI (US); Michael L. Lanser, Holland, MI (US)

(73) Assignee: Innotec, Zeeland, MI (US)

( * ) Notice: Subject to any disclaimer, the term of this patent is extended or adjusted under 35 U.S.C. 154(b) by 186 days.

(21) Appl. No.: 11/735,059

(22) Filed: Apr. 13, 2007

(65) Prior Publication Data

US 2008/0293866 A1 Nov. 27, 2008

(51) Int. Cl.
*C08K 3/22* (2006.01)
(52) U.S. Cl. .................. 524/431; 524/430; 524/435; 264/37.29
(58) Field of Classification Search ................ None
See application file for complete search history.

(56) References Cited

U.S. PATENT DOCUMENTS

| | | | |
|---|---|---|---|
| 5,626,404 A | 5/1997 | Kelley et al. | |
| 5,853,237 A | 12/1998 | Powell et al. | |
| 6,688,713 B2 | 2/2004 | Lowe | |
| 2004/0097614 A1 * | 5/2004 | Merrington et al. | ......... 523/139 |
| 2005/0111954 A1 | 5/2005 | Nakajima et al. | |
| 2005/0280337 A1 | 12/2005 | Jackson et al. | |
| 2006/0086207 A1 | 4/2006 | Swenson | |

FOREIGN PATENT DOCUMENTS

| | | |
|---|---|---|
| EP | 0 515 874 A1 | 12/1992 |
| EP | 0 755 729 A1 | 1/1997 |
| JP | 2000302376 A | 10/2000 |
| JP | 2002309624 | 10/2002 |
| JP | 2002364023 | 12/2002 |
| JP | 2003096827 | 4/2003 |
| JP | 2005220569 | 8/2005 |
| JP | 2005282090 | 10/2005 |
| WO | 0242566 | 5/2002 |

* cited by examiner

*Primary Examiner*—David Wu
*Assistant Examiner*—Vu Nguyen
(74) *Attorney, Agent, or Firm*—McGarry Bair PC

(57) ABSTRACT

A composite material comprises a particulate material generated as a waste by-product of an industrial process, and a binder for binding the particulate material into a uniform mass. The particulate material and binder are combined in preselected proportions and compressed to form a counterweight having a preselected density and a fixed configuration. A counterweight is manufactured by selecting a first proportion of a particulate material generated as a waste by-product of an industrial process, selecting a second proportion of a binder for binding the particulate material into a uniform mass, combining the first proportion of the particulate material with the second proportion of the binder into a uniform mass, forming the counterweight from the uniform mass, and incorporating the counterweight into a finished product.

7 Claims, 3 Drawing Sheets

COMPOSITE COUNTERWEIGHT AND METHOD OF MAKING SAME

BACKGROUND OF THE INVENTION

1. Field of the Invention

In one aspect, the invention relates to a counterweight. In another aspect, the invention relates to a counterweight fabricated of high density particulate waste materials.

2. Description of the Related Art

It is often necessary to counterbalance an off-centered load associated with a piece of machinery, a vehicle, or a piece of furniture. Counterweights are utilized for this purpose. Typically, such counterweights are incorporated into the item. Due to aesthetic and size constraints, it is frequently necessary to minimize the dimensions of the counterweight. Thus, a material having a high density is utilized.

High-density counterweight material typically consists of steel, iron, and similar high-density metals. However, such materials are costly.

It is increasingly desirable to find alternative uses for manufacturing byproducts and other waste materials that are generally disposed of in a landfill or offshore. Material that is a byproduct of smelting, steelmaking, and other foundry operations frequently has a relatively high density. It is readily available, and economical compared to the cost of high-density metals. However, such material is typically generated in a loose, granular condition, which can complicate its use as a counterweight.

SUMMARY OF THE INVENTION

In a first embodiment of the invention, a composite material comprises a particulate material generated as a waste by-product of an industrial process, and a binder for binding the particulate material into a uniform mass. The particulate material and binder are combined in preselected proportions and compressed to form a counterweight having a preselected density and a fixed configuration.

In a second embodiment of the invention, a method of manufacturing a counterweight comprises the steps of selecting a first proportion of a particulate material generated as a waste by-product of an industrial process, selecting a second proportion of a binder for binding the particulate material into a uniform mass, combining the first proportion of the particulate material with the second proportion of the binder into a uniform mass, forming the counterweight from the uniform mass, and incorporating the counterweight into a finished product.

DESCRIPTION OF AN EMBODIMENT OF THE INVENTION

Figure 1:
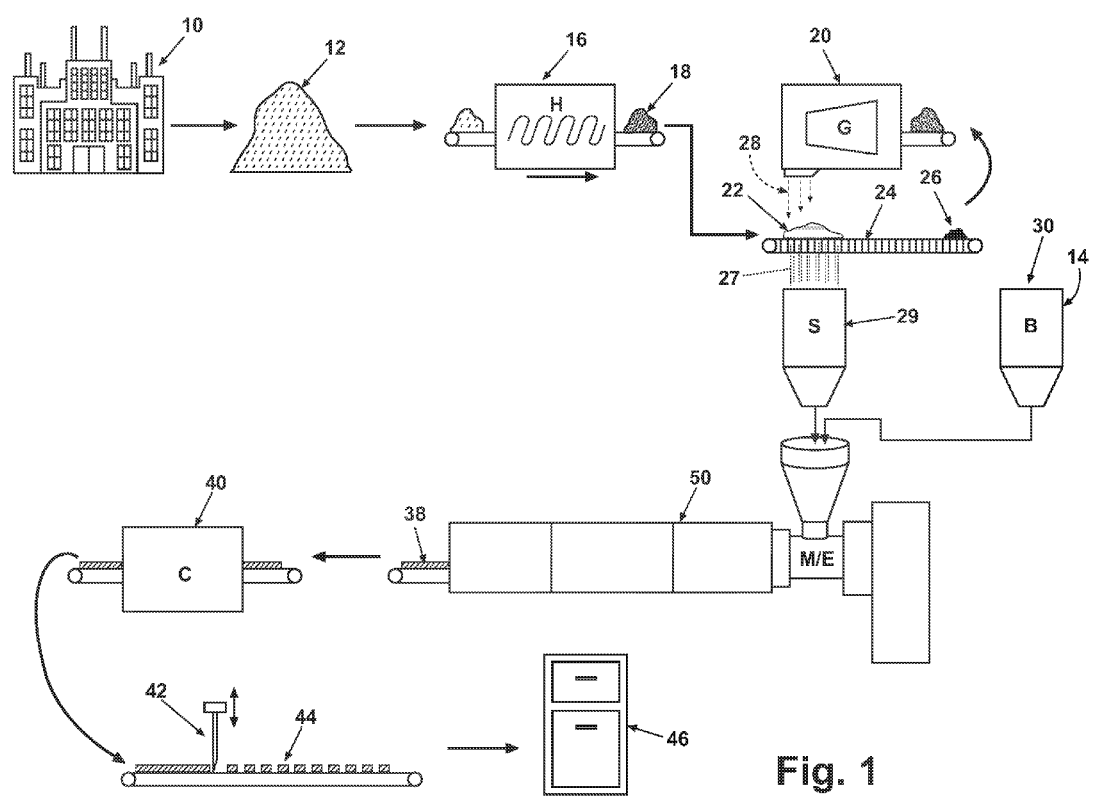
FIG. 1 is a schematic view of a first embodiment of a process for fabricating a counterweight from a particulate waste material and a thermoplastic or thermoset binder according to the invention.

An embodiment of the invention is described herein as comprising a composite mixture of granular or particulate waste material and a thermoplastic or thermoset binder, which are combined in selected proportions and compacted into a generally homogeneous material having a selected density. The compacted material can be fabricated in selected sizes and utilized as inexpensive counterweights for a variety of applications. A preferred application is a counterweight for filing cabinets.

The counterweights can be prepared from a variety of waste materials such as mill scale, oxygen furnace clarifier grit, taconite mine tailings, and the like. The principal factor in determining the suitability of a material is the density of the material. Other factors include uniformity of particle size and the proportions of constituents comprising the waste material.

Mill scale is a byproduct of steel production. Molten steel is used to produce slabs, which are worked by rollers during the cooling process to produce slabs of a selected thickness. As a slab passes through a succession of rollers, a thin layer of oxidized iron is created on the surface of the slab. High pressure water is directed onto the surface of the slab to remove the oxidation, referred to as "scale." The resulting mixture of scale and water is collected and filtered to separate the scale from the water. The scale is disposed of as a non-hazardous waste material.

The scale is typically a uniform, flaky or granular material containing greater than 70% by weight of iron oxide. Other constituents, such as manganese, carbon, silicon, aluminum, chromium, lead, zinc, and other metals, are present in proportions of generally less than 1%. It is a normally stable, inert material, with a specific gravity of greater than 5.0.

Oxygen furnace clarifier grit is a waste product generated by steel mill off gas scrubbers used with basic oxygen furnaces. The grit is typically a uniform granular or particulate material generally containing greater than 76% iron oxide, and lesser proportions of calcium oxide, carbon, manganese, zinc, chromium, lead, and other constituents. It is generally stable and inert, and has a specific gravity of about 7.0.

Scrubbers typically utilize a closed loop water system to accumulate and remove particulates from the oxygen furnace off gas. The grit may be generated in the form of a sludge when mixed with water as part of the scrubber process. Large particles and heavy fractions are mechanically removed from the water-based sludge, with finer particles collected in clarifiers and dewatered using a filter press. The accumulated grit and fine particles are typically disposed of as a non-hazardous waste material.

Taconite mining waste is generated in one of two forms. The waste comprises either bedrock that does not contain sufficient ore for processing and must be disposed, or unwanted minerals which are an intrinsic part of the ore-containing rock and must be removed during processing. This material is referred to as "tailings." Taconite tailings contain primarily quartz in the proportion of 55-60% by weight, followed by hematite at 8-12%, and iron-bearing carbonates, silicates, and magnetite, in proportions of less than 10%. Trace concentrations of heavy metals are also frequently found in tailings.

Each of these waste products can be utilized as a counterweight material. Mill scale has been found to be particularly well-suited for counterweight production because of its ready availability, its high proportion of high density constituents, and its generally uniform particle size distribution.

The production of counterweights according to the invention will now be described with respect to the use of mill scale. However, the process is generally the same for other waste materials such as oxygen furnace clarifier grit and taconite tailings. The basic process involves mixing a binder with the mill scale in selected proportions to provide a counterweight having an optimum density. It has been found that a preferred binder comprises a thermoplastic or thermoset material.

The thermoplastic or thermoset binder can comprise a polyolefin such as high density polyethylene or polypropylene, a phenolic, methylene diphenyl diisocyanate, and the like. The binder can comprise virgin material, or a recycled material such as recycled powder coating or other commonly-recycled thermoplastics or thermoset materials. Other suitable binders can include a non-polymeric material such as sodium silicate, also known as "waterglass," or a mixture of molasses and lime. It may be necessary to pre-process the thermoplastic material into a selected particle size, or to remove impurities or contaminants, particularly if waste materials are used as the binder.

Referring to FIG. 1, the mill scale 12 is obtained from a suitable generator 10, such as a steel mill. An optional first step in the production of counter weights is to dry the mill scale in a dryer 16 to drive off excess moisture that may be present. The moisture content of the mill scale after drying should be no more than 12% by weight. A preferred moisture content is 2% by weight. Drying can be accomplished prior to mixing the mill scale with the binder, as illustrated in FIG. 1. Alternatively, the mill scale can be dried during the process of mixing the mill scale with the binder in a mixing apparatus or a combination mixing and extruding apparatus, as hereinafter described. Drying may not be necessary, but is preferred in order to more accurately control the fabrication of the end product, and its resultant density.

The mill scale 22 is screened to remove particles 26 which are too large for incorporation into the selected end product, or which fall outside a preselected size distribution. The particle size distribution can range from 0.1 mm to 12.5 mm. A preferred particle size is between 0.5 mm and 6.25 mm.

The screened material 27 is delivered to a storage reservoir 29, while the oversized material 26 is delivered to a grinder 20 for further processing into the selected size distribution. Grinding may be accompanied by additional screening and grinding as necessary to generate a material falling within the selected size distribution. The particle size distribution of the mill scale as it comes from the source may allow the screening and grinding steps to be eliminated. The ground and screened mill scale 28 is then sent to the storage reservoir 29.

Figure 2:
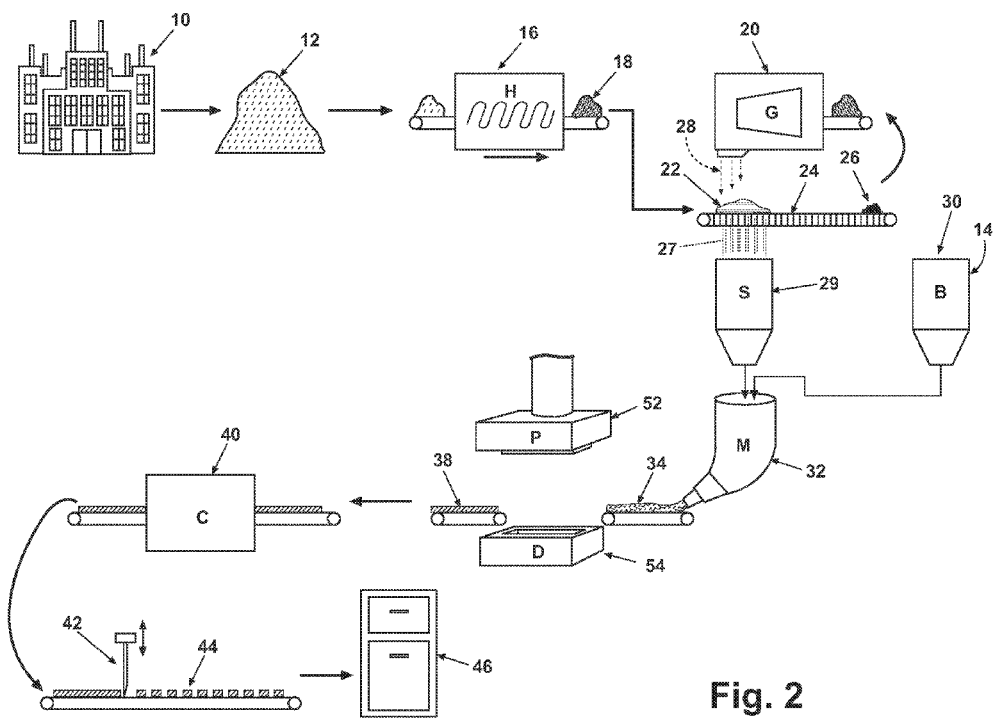
FIG. 2 is a schematic view of a second embodiment of a process for fabricating a counterweight from a particulate waste material and a thermoplastic or thermoset binder according to the invention.
Figure 3:
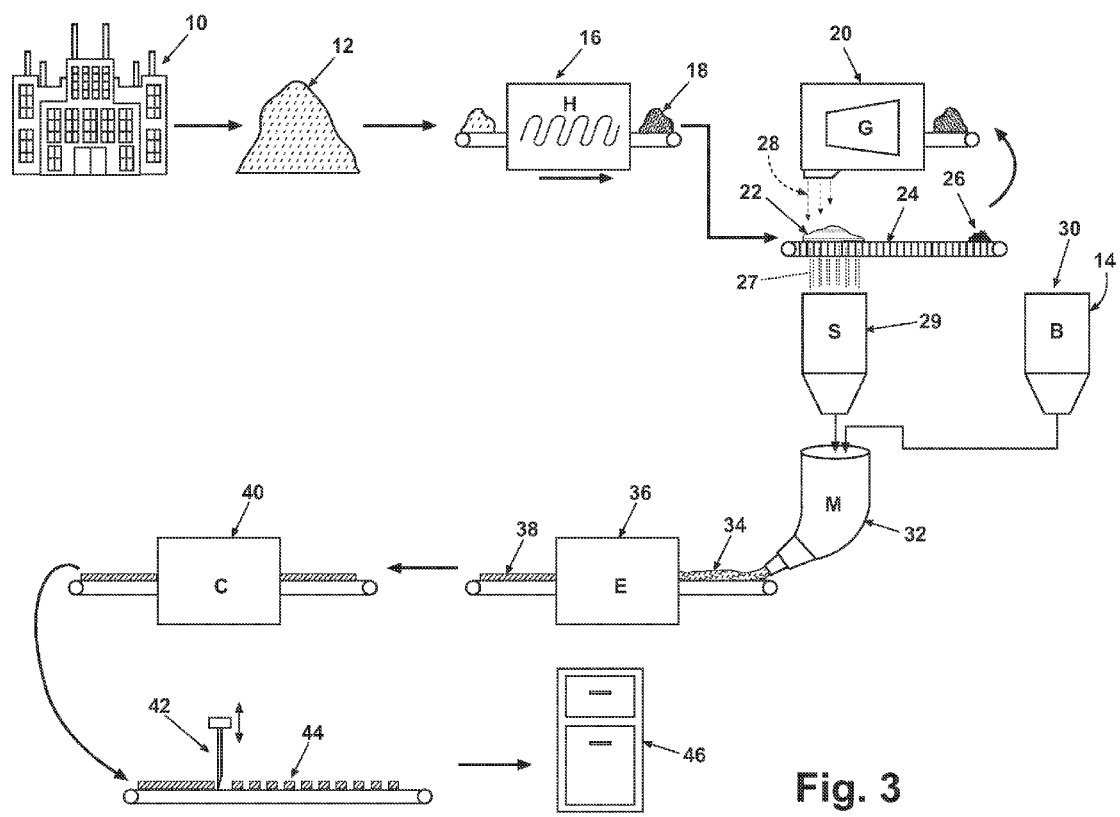
FIG. 3 is a schematic view of a third embodiment of a process for fabricating a counterweight from a particulate waste material and a thermoplastic or thermoset binder according to the invention.

The thermoplastic or thermoset binder 14 is also processed as necessary, particularly if the binder 14 is a recycled material, to remove unwanted constituents or contaminants, or to generate a preselected particle size distribution. The binder 14 is stored in a binder reservoir 30, then combined with the mill scale from the storage reservoir 29 in a combination mixer/extruder 50, or a mixing station 32 (FIGS. 2 and 3).

The mill scale 28 and/or the binder 14 may be heated prior to the introduction of the two components into the mixer/extruder 50 or mixing station 32. Thermoplastics typically will not require preheating, as the mixing and working of the binder and mill scale in the mixer/extruder 50 or mixing station 32 will generate sufficient heat to place the binder in a desired workable state. It has been found that a temperature of about 180° F. can be generated in this way for a high-density polyethylene. Thermosets will typically require a higher temperature, which will necessitate the use of an external heat source. Thermoset materials will typically be heated to a temperature of between 325° F. and 500° F. This heating can occur in the mixer/extruder 50 or mixing station 32. The temperature of the binder is selected primarily on the basis of the specific thermoplastic or thermoset binder utilized and the workability desired for the composite material in order to facilitate the mixing of the materials and the homogeneity of the resulting mixture.

Several alternative heating methods can be employed for heating and mixing the mill scale with the binder. In one process, the mill scale and binder are heated separately and then combined. In another process, room temperature mill scale is mixed with heated binder. In another process, the mill scale and binder are mixed at room temperature, followed by heating of the entire mixture in the mixing apparatus. In yet another process, the mill scale and binder are combined at room temperature and heated through the shearing action of the mixing machine on the mixture. This generally is only effective for thermoplastic binders, since the temperature generated through the mixing action will be insufficient for thermoset binders.

Referring to FIG. 1, after processing the mill scale and binder, the materials can be delivered from the reservoirs 29, 30 to a combination mixing and extruding apparatus 50. A suitable combination mixing/extruding apparatus is a single or twin-screw extruder manufactured by CDL Technology Inc. of Addison, Ill. The mixing process in the mixing/extruding apparatus 50 may be sufficient to heat a thermoplastic binder to a desired degree of workability. The mixing/extruding apparatus 50 combines the mill scale and binder into a composite product 38 having a selected density and dimensions.

The composite material is then passed through a cooling chamber 40 and cooled using either air or water, followed by machining of the material into the final product in a machining apparatus 42. Machining can be completed when the material has completely cooled and hardened, or while the mixture is still somewhat warm and pliable. The finished product 44 can then be utilized in the further manufacture of items requiring a counterweight, such as a file cabinet 46.

An alternate process for combining the mill scale and binder and forming the composite product is illustrated in FIG. 2. In this embodiment, the mill scale and binder are processed as previously described, and stored in the reservoirs 29, 30. Material from the reservoirs 29, 30 is delivered to a suitable mixer 32 for combining the mill scale and binder into the composite material 34, such as a Banbury® internal batch mixer manufactured by Farrel Corporation of Ansonia, Conn. As with the combination mixing/extruding apparatus 50, the mixing process in the mixer 32 may be sufficient to heat a thermoplastic binder to a desired degree of workability. After mixing, the composite material 34 is delivered to a die 54 configured to provide a product having selected finished product dimensions. The material 34 is compressed in the die 54 by a suitable press apparatus 52 to a selected density. It is anticipated that compression would be done after the mixture has cooled somewhat in order to facilitate the compression process. The material is then removed from the die 54, cooled, and machined, as described above.

A third process for combining the mill scale and binder and forming the composite product is illustrated in FIG. 3. In this embodiment, the mill scale and binder are processed as previously described, and stored in the reservoirs 29, 30. Material from the reservoirs 29, 30 is combined in the mixer 32. After heating and mixing, the mixture 34 is extruded in an extrusion apparatus 36 into a composite product 38 having a selected density and dimensions. The extrusion process and apparatus can be adapted to provide a product having a selected size and density.

The relative proportions of mill scale and binder will be dependent upon such factors as the unit weight of the mill scale, the type of thermoplastic or thermoset binder utilized, and the target density of the end product. Preferred proportions of mill scale and binder are 95% by weight mill scale and 5% by weight binder. However, proportions of 80-98% by weight mill scale and 2-20% by weight binder have been found to be suitable. A target density for a counterweight for use in a file cabinet is 51% of the density of steel, or approximately 250 pounds per cubic foot. However, achievable densities can range from 170 pcf to 340 pcf.

Steel scrap, such as scrap from the manufacture of nails, screws, and the like, can be added at the time of heating and mixing the mill scale and binder in order to provide a product having an increased density.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A composite material comprising:
    a particulate material comprising at least one of steel mill scale, oxygen furnace clarifier grit, and taconite mine tailings, having a particle size greater than 0.5 millimeter but no greater than 12.5 millimeters; and
    a binder for binding the particulate material into a uniform mass;
    wherein the particulate material and binder are combined in preselected proportions and compressed to form a counterweight having a preselected density and a fixed configuration.

2. A composite material according to claim 1, wherein the particulate material comprises iron oxide.

3. A composite material according to claim 1, wherein the binder is one of a polyolefin, polyethylene, polypropylene, a phenolic, methylene diphenyl diisocyanate, sodium silicate, a thermoset plastic, and a mixture of molasses and lime.

4. A composite material according to claim 1, wherein the proportion of particulate material ranges from 80% to 98%, and the proportion of binder ranges from 20% to 2%.

5. A composite material according to claim 4, wherein the proportion of particulate material is 95%, and the proportion of binder is 5%.

6. A composite material according to claim 1, wherein the density of the counterweight ranges from 70 pcf to 340 pcf.

7. A composite material according to claim 6, wherein the density of the counterweight is 250 pcf.

\* \* \* \* \*